Figure 1:
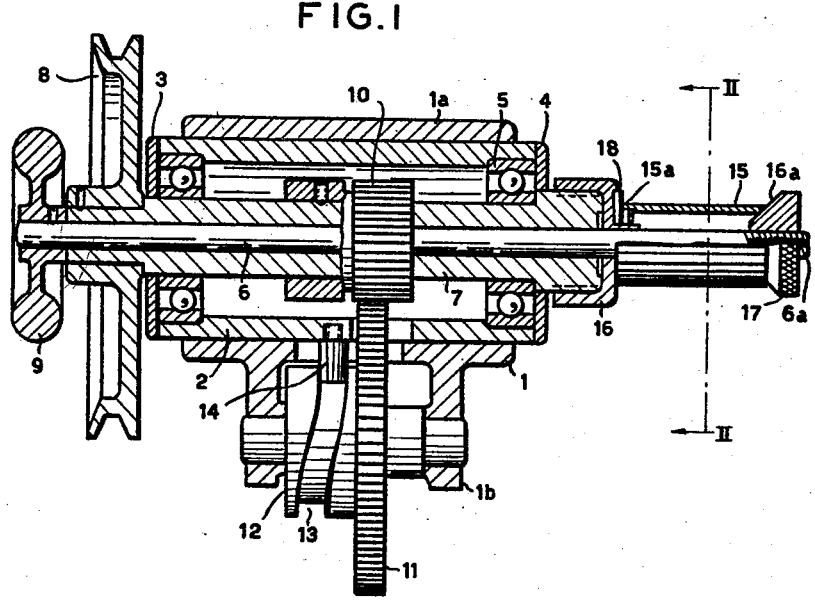

April 20, 1954     J. KERN     2,675,602

FILING MACHINE

Filed Nov. 24, 1950

Jakob Kern    INVENTOR

BY Wenderoth, Lind + Ponack

ATTORNEYS.

Patented Apr. 20, 1954

2,675,602

UNITED STATES PATENT OFFICE 2,675,602

FILING MACHINE

Jakob Kern, Zurich, Switzerland

Application November 24, 1950, Serial No. 197,303

Claims priority, application Switzerland
December 17, 1949

2 Claims. (Cl. 29—76)

This invention relates to improvements in filing machines, i. e. machines for tooling work pieces by means of one or more files.

The invention relates in particular to a filing machine provided with one or more cylindrical file bodies.

The main object of the invention is to provide a filing machine of simple construction which is particularly suitable for filing hollow end surfaces to tubes such that these tubes may be quickly connected with other tubes and that a clean joint between such tubes, which will be at an angle, is obtained.

Another object of the invention is a filing machine, which is of particular use in the manufacture of bicycle frames and steel tube furniture.

Still another object of the invention is a filing machine of such construction that very cheap file bodies may be readily secured to the machine.

A further object of the invention is a filing machine enabling high speed filing.

Having these objects in view the invention provides a filing machine adapted for operation with a cylindrical file body, comprising a spindle for driving said file body, a fixture for securing said body to one end of said spindle and a gear for transforming a rotary movement into a reciprocating movement, said spindle being driven for rotation and coupled with the part of said gear which performs said reciprocating movement.

Figure 2:
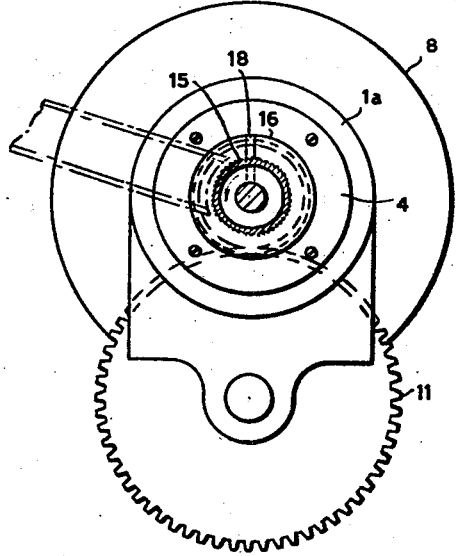

In the drawing:

Figure 1 is a vertical longitudinal section of one embodiment of the invention and Figure 2 is a front view and in part a section according to the line II—II in Figure 1.

In a machine casing 1 and in particular in the hollow cylindrical top part 1a thereof a sleeve-shaped bearing casing 2 is mounted such that it may be moved in axial direction. Both ends of the sleeve 2 are closed by annular discs 3 and 4. Ball bearings 5 are mounted in the sleeve.

A spindle body 7 is journalled in said ball bearings. A central spindle 6 is inserted in the hollow spindle body 7 and connected therewith for rotation. At the left hand side of the drawing called the drive side a pulley 8 is secured to the spindle 7. Said pulley may be driven e. g. by means of a V-belt. On the end of the spindle 6 at the drive side of the machine a hand wheel 9 has been secured. Within the sleeve 2 a pinion 10 is secured to the spindle 7. Said pinion 10 is in mesh with a gear wheel 11 journalled in the lower part 1b of the machine casing. A ring body 12 is secured to the shaft of said gear 11. This body 12 is provided at its periphery with a cam track 13 shaped as a groove at an angle to the axis of the body 12. A stud 14 secured to the sleeve 2 engages the same track 13, such that upon rotation of the spindle 7 the sleeve 2 will be reciprocated in axial direction. The fixture for securing the file body 15 which is of tubular nature comprises a carrying body 16 and a nut 17. The body 16 is screwed on the end of the spindle 7 which protrudes from the sleeve 2. The nut 17 is screwed on the end of the central spindle 6. Said end 6a is provided with screw thread. The surface 16a of the nut 17 which is directed towards the machine is of a tapering nature. The tubular file body 15 at its end near the nut 17 is provided with a seat surface, which engages the tapering surface of the nut 17. The other end of the tubular file body 15 is provided with a recess 15a. In this recess a radial cam 18 secured to the carrying body 16 is located, so that the carrying body can carry along the file body for rotation.

It is evident that this filing machine is very suitable for quickly tooling the ends of tubes which are fed in a direction perpendicular to the axis of the file body.

Other means for imparting a reciprocating movement to the file body come within the scope of my invention.

Having now described the art and the nature of my invention and the objects thereof, what I claim is:

1. A filing machine for operation with a cylindrical file body fixed to one end of a driving spindle comprising a driving spindle journalled in a reciprocating bearing case adapted to move in its axial direction, a roll provided with a peripheral curved track, a driving gear between said roll and said spindle and a radially extending part at said bearing case in engagement with said curved track.

2. A filing machine according to claim 1 in which the fixing means for a cylindrical file body comprise a carrying cap screwed on the free end of the driving spindle, a stretching spindle in said driving spindle and a nut screwed on the free end of a stretching spindle penetrating into and protruding from the driving spindle, said nut having a conical inside border surface, the carrying cap being provided with a cam directed radially for engaging a recess in the opposite border of a file body when the same is stretched between the conical nut and the carrying cap.

References Cited in the file of this patent

UNITED STATES PATENTS

| Number | Name | Date |
|---|---|---|
| 1,103,957 | Gordon | July 21, 1914 |
| 1,709,654 | Bradley | Apr. 16, 1929 |